US008684133B2

(12) United States Patent
Vogel (10) Patent No.: US 8,684,133 B2
(45) Date of Patent: Apr. 1, 2014

(54) ACOUSTICALLY DAMPED COMPONENT (75) Inventor: Claus Vogel, Schwabach (DE)

(73) Assignee: MAN Truck & Bus AG, Munich (DE)

(*) Notice: Subject to any disclaimer, the term of this patent is extended or adjusted under 35 U.S.C. 154(b) by 0 days.

(21) Appl. No.: 13/598,714

(22) Filed: Aug. 30, 2012

(65) Prior Publication Data
US 2013/0220733 A1   Aug. 29, 2013

(30) Foreign Application Priority Data

Sep. 1, 2011  (DE) .......................... 10 2011 112 313

(51) Int. Cl.
E04B 1/82 (2006.01)
(52) U.S. Cl.
USPC .............................. 181/286; 181/210; 181/229
(58) Field of Classification Search
USPC .......................................... 181/210, 286, 229
See application file for complete search history.

(56) References Cited

U.S. PATENT DOCUMENTS

| | | | | |
|---|---|---|---|---|
| 3,773,141 A | * | 11/1973 | Thien et al. ................... | 181/293 |
| 4,480,609 A | * | 11/1984 | Hayashi ..................... | 123/195 C |
| 5,531,196 A | * | 7/1996 | Clark ......................... | 123/195 C |
| 7,509,935 B2 | * | 3/2009 | Vincer et al. ............... | 123/195 C |
| 2005/0194209 A1 | * | 9/2005 | Yang et al. ..................... | 181/286 |
| 2006/0177611 A1 | * | 8/2006 | Josefsson ..................... | 428/34.1 |
| 2009/0071747 A1 | * | 3/2009 | Hazelton et al. .............. | 181/210 |
| 2012/0067322 A1 | * | 3/2012 | Andersson et al. ......... | 123/198 E |

FOREIGN PATENT DOCUMENTS

JP          2009185651 A  *  8/2009

* cited by examiner

Primary Examiner — Forrest M Phillips (74) Attorney, Agent, or Firm — Cozen O'Connor (57) ABSTRACT Acoustically damped component for a vehicle, an engine, a transmission or a vehicle trim panel, includes a flat basic body provided on at least one side with a rib structure. The ribs of the rib structure form chambers which are arranged irregularly on at least one region of the component, which has a resonant frequency of from 200 to 1000 Hz. The chambers are configured irregularly in such a way that chambers of the component have different dimensioning and/or geometry in comparison with adjoining chambers, such that emitted airborne sound can be reduced and/or eradicated. A response to a transient excitation of at least two part areas of that surface of the component which is provided with the chambers having a correlation of from 0.5 to 0.85, preferably of from 0.6 to 0.7.

33 Claims, 7 Drawing Sheets

ACOUSTICALLY DAMPED COMPONENT

BACKGROUND OF THE INVENTION

1. Field of the Invention

The present invention relates to an acoustically damped component preferably for a vehicle, an engine, a transmission or a vehicle trim panel comprising a flat basic body which is provided on at least one side at least in regions with a rib structure, the ribs of the rib structure forming chambers and the chambers being arranged irregularly on at least one region of the component.

2. Description of the Related Art

U.S. Pat. No. 3,773,141 teaches a wall element which is provided with a lattice structure and forms a highly rigid and greatly noise-damped component with a low additional material requirement. Here, the wall element is of particularly rigid construction as a result of the lattice structure, the ratio of rib height plus basic-body thickness to basic-body thickness being greater than 4 and, at the same time, the ratio of chamber inner-side length to the rib thickness is between 4 and 14. U.S. Pat. No. 3,773,141 aims at increasing the rigidity and therefore influencing the resonance amplitude ratio of the component as a result of the design of the rib system. A reduction in the noise emissions can be achieved merely to a restricted extent by the strategy of component reinforcement.

An object of the present invention is the development of an acoustically damped component preferably for a vehicle, an engine, a transmission or a vehicle trim panel in such a way that the noise emission of the system which is provided with the acoustically damped component is modified and/or reduced significantly. Furthermore, in addition to a targeted change in the noise characteristic, it is an object of the invention to achieve increased mechanical protection of the acoustically damped component.

SUMMARY OF THE INVENTION

It is considered to be the core concept of the present invention that the component has a resonant frequency of from 200 to 1000 Hz and the chambers are configured irregularly in such a way that, at least in regions, chambers of the component have different dimensioning and/or geometry in comparison with the chambers which adjoin them, such that, starting from the chambers, emitted airborne sound is reduced and/or eradicated mutually in the near field, a response to a transient excitation of at least two part areas of that surface of the component which is provided with the chambers having a correlation of from 0.5 to 0.85, preferably of from 0.60 to 0.70.

It has been discovered that the ribs can serve as delimitation of part areas which have an irregular structure and in the process, on account of the stochastic distribution of acoustic dipole sources, bring about mutual reduction or eradication of emitted airborne sound in the near field and therefore do not permit sound emission in a frequency band (band-stop filter). To this end, it is advantageous if the component has a defined resilience despite the rib system, in order thus to set amplitudes in desired frequency bands, in order to produce a defined minimum sound pressure level for these frequencies, preferably in the low range.

The defined minimum resilience of the component arises from the requirement of the resonant frequency of the component in the range from 200 to 1000 Hz. As a result of the irregular chambers which form irregular part areas, the reduction and/or eradication of the airborne sound which is emitted by the part areas in the near field is achieved. The different dimensioning and/or geometry according to the invention of the chambers achieve/achieves a situation where the spectral power density is different from the adjacent chambers.

If the component according to the invention is excited transiently by way of, for example, a hammer, the response of at least two part areas of that surface of the component which is provided with the chambers has a correlation of from 0.50 to 0.85, preferably of from 0.60 to 0.70. This can be tested by way of a sound intensity measurement at the adjacent part areas. The correlation of the two time profiles from the sound intensity measurements preferably lies within the abovementioned sound intensity limits. The cross-correlation is used to compare the two response signals.

In one preferred embodiment, at least one sixth, preferably at least one quarter, particularly preferably at least one half of the chambers is configured irregularly in this way. A significantly effective influence of the chambers on the sound emission behaviour of the component can be achieved by this minimum coverage. As an alternative or in addition, a part area of that face of the component which is provided with chambers has no chamber of identical geometry and/or dimensioning, the part area having a size of at least 5% of that entire face of the component which is provided with chambers, preferably has a size of at least 25%, particularly preferably has a size of at least 80% of that entire face of the component which is provided with chambers.

In a further advantageous embodiment, the rib width of a chamber is smaller than the chamber-bottom thickness of the said chamber; the rib width to the chamber-bottom thickness preferably corresponds to the ratio from 1.0:1.2 to 1:20, particularly preferably to the ratio from 1.0:1.8 to 1:3. These ratios of the rib width to the chamber-bottom thickness ensure a minimum elasticity of those faces of the component which are provided with ribs. This resilience is necessary, in order to achieve the desired acoustic reaction of the chambers. An eradication or reduction of the sound emitted by the component can be achieved by the fact that the chambers vibrate in a defined manner.

As an alternative or in addition, it is advantageous for the minimum resilience if the rib height plus chamber-bottom thickness in ratio to the chamber-bottom thickness is less than 4:1, preferably less than or equal to 3.5:1, particularly preferably less than or equal to 3:1. The basic-body thickness, for example, can be used as chamber-bottom thickness.

The different dimensioning and/or geometry comprise/comprises adjacent chambers which are distributed irregularly and/or are of different size and have an irregular circumferential geometry. As a result of the different design of adjacent chambers, the emitted sound proportions of the individual chambers can cancel one another out, with the result that the noise emission of the entire component as the total at least of all the chambers which are designed according to the invention is equal to zero or is at least reduced significantly. The geometry and/or dimensioning of the chambers are/is preferably selected in such a way that the maximum emission frequency of the adjacent chambers is eradicated and/or reduced.

As an alternative or in addition, at least one first chamber is different in terms of geometry and/or dimensioning in such a way that none of the chambers which are adjacent to the said first chamber can be produced/reproduced by scaling, inversion and/or rotation of the first chamber. Here, the scaling comprises stretching or distortion. The first chamber can also not be reproduced by rotation, inversion or the like of one of the adjacent chambers. The sound-reducing effect is aided by an irregularity of this type.

For simpler design and production of the chambers, it is advantageous if all the ribs of a chamber extend rectilinearly and if preferably all the ribs enclose an angle of less than or equal to 180° with respect to adjacent ribs of a chamber. Even if a rib forms a wall section for a plurality of chambers and the rib has a rectilinear course over a plurality of chambers, this simplifies a defined design of the chambers which reduces and/or eradicates the sound emission in the near field.

The result of tests have been the following advantageous dimension ranges of the chamber and rib structure in the field of automotive technology, in particular for vehicle components in automotive engineering, particularly preferably of commercial vehicles which are equipped with diesel engines and/or hybrid concepts. The circumference of a chamber is advantageously between 15 mm and 200 mm, preferably between 35 mm and 95 mm, and/or the area of a chamber is between 30 mm$^2$ and 1000 mm$^2$, preferably between 60 mm$^2$ and 490 mm$^2$, and/or the volume of a chamber is between 250 mm$^3$ and 5000 mm$^3$, preferably between 400 mm$^3$ and 3000 mm$^3$.

Also for the circumference-to-area ratio of the chambers of the component, it has been possible to determine that the ratios between 1:1 and 1:10, preferably between 1:1.5 and 1:5.5, are advantageous.

If the component is a cover element of an engine, an oil sump, an interior trim panel and/or an engine attachment part, and has a minimum longitudinal extent of 400 mm, preferably of 750 mm, particularly preferably of 1000 mm, there is once again effective sound reduction behavior. A cover element of an engine can be, for example, a control-housing cover.

Furthermore, the premise is also to be mentioned that the maximum longitudinal extent of at least half, preferably of all the chambers according to the invention of the component does not exceed 95 mm, preferably 75 mm, particularly preferably 50 mm, and/or the maximum longitudinal extent of at least half, preferably of all the chambers of the component does not undershoot 3 mm, preferably 5 mm, particularly preferably 10 mm, as advantageous design criterion.

Particularly effectively acting sound reduction or sound eradication in the near field of the component can be achieved by the consideration of individual ones or all of the above-mentioned concrete dimension ranges.

In the targeted design of the rib and chamber structure, it has been determined that, in particular, triangular and pentagonal chambers are advantageous for the structure according to the invention. Preferably at least half of the chambers of the component, very preferably at least three quarters of the chambers of the component are of triangular or pentagonal configuration. As an alternative or in addition, at least one, preferably over half of the chambers are surrounded by at least 5, preferably by at least 6 or particularly preferably by at least 7 adjacent chambers.

In order to meet the remaining mechanical requirements of the component, it is advantageous to arrange reinforcing struts on the component, in addition to the rib structure according to the invention. The said reinforcing struts can also coincide at least partially with the rib structure. It is to be noted here that the areas between the reinforcing struts have a resilience which is permitted by the rib structure according to the invention. Although a reduction in the resilience is associated with the reinforcing struts, the reduction or eradication of the near-field sound is ensured by corresponding spacing of the reinforcing struts and therefore a defined minimum area size for the areas which are situated between the reinforcing struts.

It is advantageous as mechanical protection of the open chamber volumes if the openings of the chambers are spanned at least in regions by a flexible element, preferably a flexible film. The depositing of dust or other dirt within the chambers is therefore prevented. The unchecked depositing of dirt, dust or other elements within the chambers can influence their resilience and therefore the sound reduction/eradication effect.

According to a further embodiment of the invention, in the final assembled state, the component is arranged on a further structural element, a cavity of the structural element being covered at least in regions by the component, and the rib structure being arranged on the side which faces away from the cavity in the final assembled state of the component. In this case, the ribs and/or the reinforcing ribs can serve as sacrificial ribs against elements which act mechanically from the outside (for example, stone chipping) and which therefore protect the component.

The component according to the invention is preferably formed at least in regions from a plastic and/or a composite material. For example, the component can be produced as a cast part, preferably as an injection-molded part; the "complicated" structure of the ribs can therefore be realized in an inexpensive way.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail using exemplary embodiments in the figures of the drawing, in which.

DETAILED DESCRIPTION OF THE PRESENTLY PREFERRED EMBODIMENTS

Figure 8:
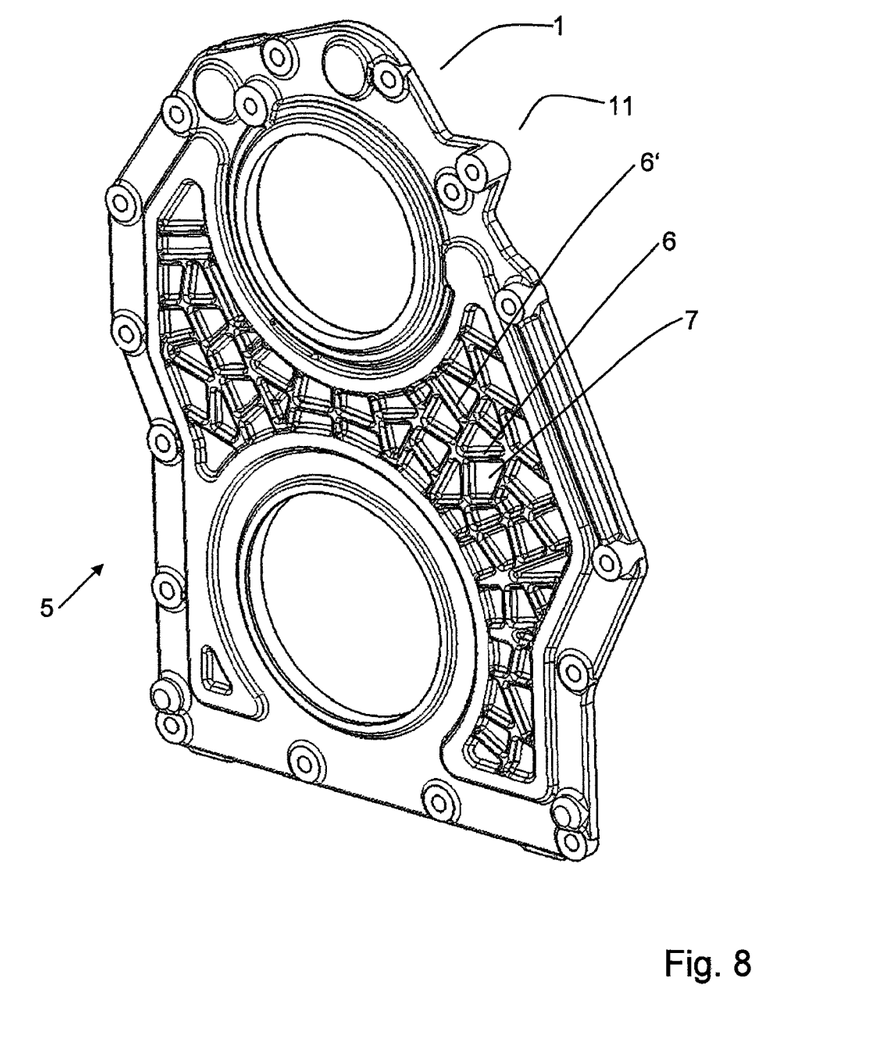
FIG. 8 shows a diagrammatic perspective illustration of a control-housing cover which is provided with the rib structure according to the invention.

As exemplary embodiments of the component which is provided with the ribs according to the invention, the said component is configured as an oil sump 2 in FIGS. 1 to 7 and as a control-housing cover 11 in FIG. 8.

Figure 1:
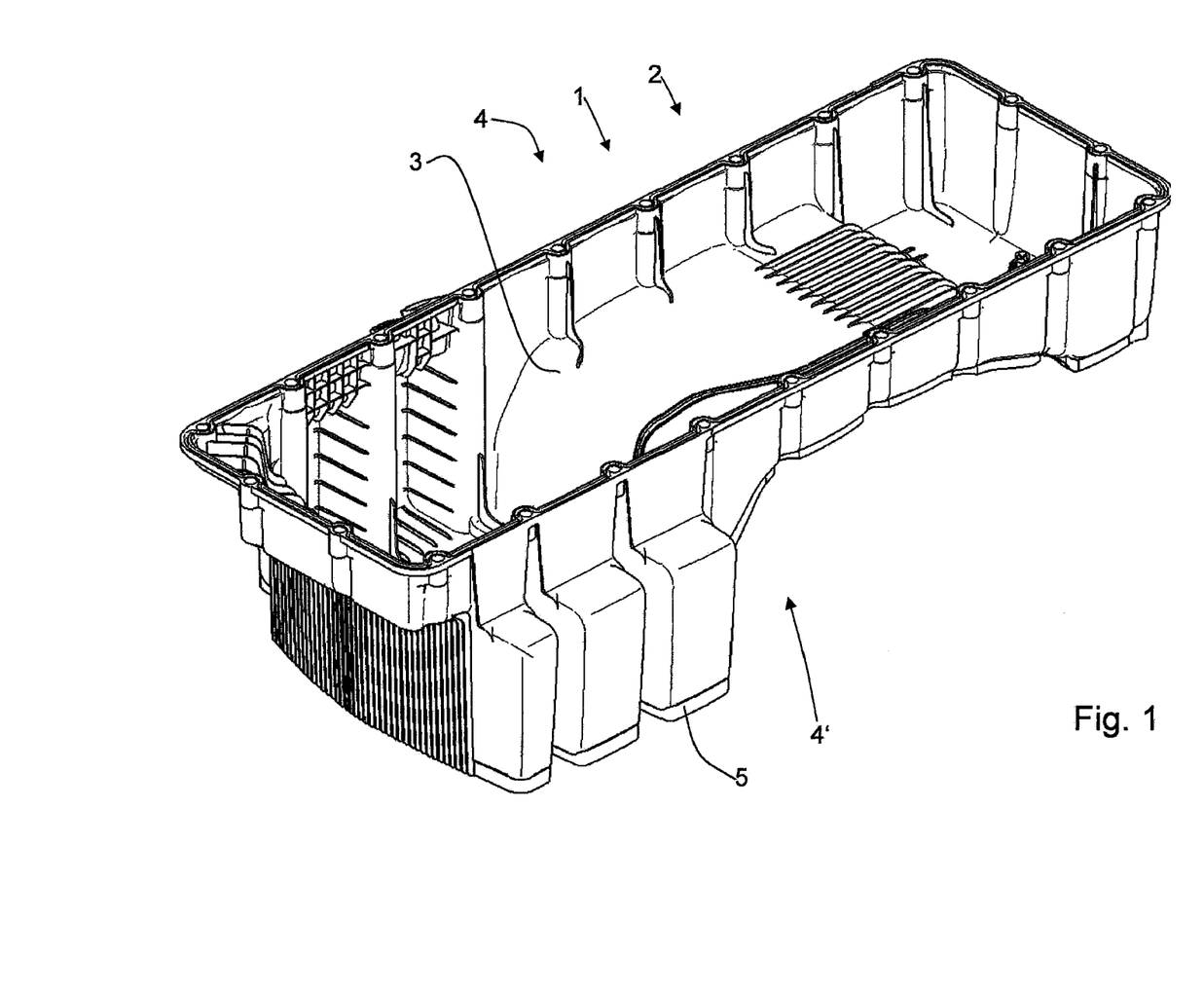
FIG. 1 is a diagrammatic perspective illustration of an oil sump which is provided with the rib structure according to the invention.

The acoustically damped component 1 shown in FIG. 1 in the form of an oil sump 2 comprises a flat basic body 3 which, in a manner in which its upper side 4 is oriented on the engine side, is provided on the underside 4' with a downwardly pointing rib structure 5. The ribs 6, 6', 6", 6'" of the rib structure 5 extend in such a way that they form irregular chambers 7, 7', 7" on the basic body 3. The ribs 6, 6', 6" are dimensioned and arranged relative to the basic body 3, in such a way that only slight reinforcement of the basic body 3 is associated, with the result that, despite the ribs 6, 6', 6", 6'", the component 1 has a resonant frequency of from 200 to 1000 Hz.

The irregularity of the chambers 7, 7', 7" leads to the airborne sound which results from the chambers 7, 7', 7" being reduced and/or eradicated mutually in the near field. If the oil sump 2 experiences a transient excitation, the response reaction of at least two part areas 8, 8' of that surface of the oil sump 2 which is provided with the chambers 7, 7', 7" will have a correlation of from 0.50 to 0.85, preferably of from 0.60 to 0.70. In the embodiment which is shown, the predominant number (>80%) of the chambers 7, 7', 7" of the oil sump 2 are configured irregularly in this way.

Figure 3:
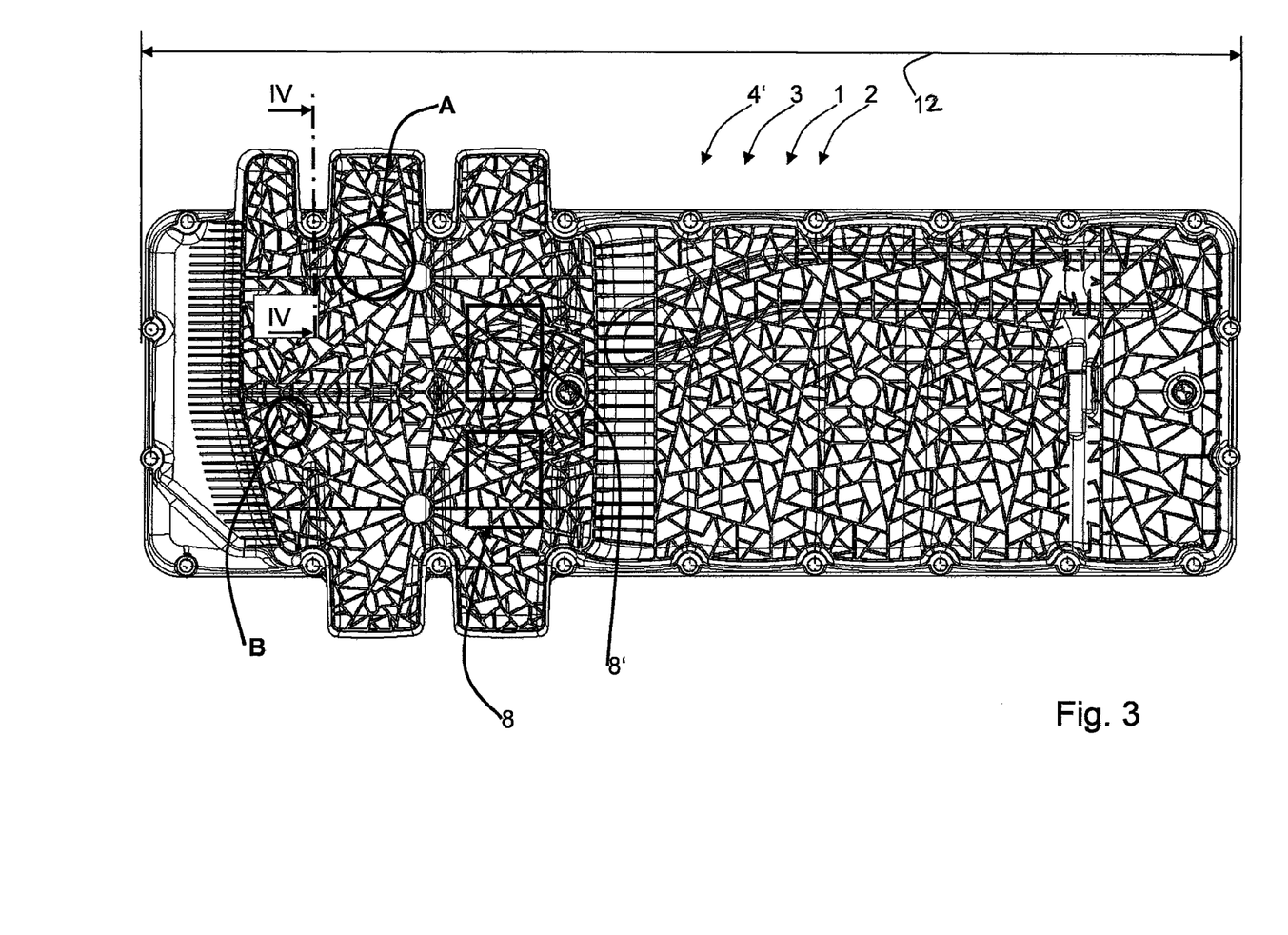
FIG. 3 is a diagrammatic view from below of the oil sump from FIG. 1.

In FIG. 3 of the drawing, the arrangement of the ribs 6, 6', 6", 6'" and the irregular structure of the chambers 7, 7', 7" can be seen over virtually the entire underside 4' of the oil sump 2. Here, the irregular chambers 7, 7', 7" comprise over half of the chambers 7, 7', 7" of the oil sump 2. No chamber 7, 7', 7" with identical geometry and/or dimensioning is arranged within a part area 8, 8' of that area of the oil sump 2 which is provided with chambers 7, 7', 7". A part area can comprise a size of at least 5%, at least 25% or at least 80% of the entire area of the component 1.

The chambers 7, 7', 7" are designed with different geometry and/or dimensioning in such a way that no chamber 7', 7" which is adjacent to a first chamber 7 can be reproduced by scaling, rotation and/or inversion of the first chamber 7.

The ribs 6, 6', 6", 6'" extend rectilinearly, the ribs 6, 6', 6", 6'" of a chamber 7, 7', 7" enclosing an angle α of less than 180°. Furthermore, the ribs 6, 6', 6", 6'" are configured at least partially in such a way that they form a wall section for a plurality of chambers 7, 7', 7", and the rib 6, 6', 6", 6'" has a rectilinear profile over a plurality of chambers 7, 7', 7". Predominantly (at least over half, preferably at least 85%), the chambers 7, 7', 7" are configured as triangles, quadrangles or pentagons and are surrounded here by at least four or preferably by at least five adjacent chambers 7, 7', 7".

In order to increase the strength of the oil sump 2, in addition to the ribs 6, 6', 6", 6'" of the rib structure 5, reinforcing struts (not shown) are arranged on the underside 4 of the oil sump 2. Here, the reinforcing struts have a greater wall thickness than the ribs 6, 6', 6", 6'" and have a reinforcing action on the oil sump 2. However, the reinforcing struts are spaced apart from one another in such a way that the areas between the reinforcing struts have sufficient elasticity, in order to achieve the sound reduction or sound emission according to the invention at the chambers 7, 7', 7". The reinforcing ribs can also coincide partially with the ribs 6, 6', 6", 6'" of the rib structure 5.

In order to ensure sufficiently elastic behavior for near-field sound reduction, the design of the ribs 6, 6', 6", 6'" relative to the basic body 3 is of significance. It has proven advantageous here if the rib width 14 of a chamber 7, 7', 7" is smaller than the chamber-bottom thickness 15 of the said chamber 7, 7', 7". In particular, a rib width 14 to chamber-bottom thickness 15 ratio of from 1.0:1.2 to 1:20, particularly preferably of from 1.0:1.8 to 1:3, has proven advantageous.

The ribs 6, 6', 6" are arranged on the outer side 4' of the oil sump 2. In the final assembled state, the oil sump 2 closes off the crankcase (not shown) on the underside, with the result that the ribs 6, 6', 6" are arranged so as to point away from the crankcase and therefore to lie free towards the surroundings.

In order to prevent depositing of dust and dirt in the chambers 7, 7', 7" which lie free towards the surroundings, it is advantageous to close the openings 10, 10' of the chambers 7, 7', 7" by way of a flexible element (not shown), preferably a flexible film.

The longitudinal extent 12 of the oil sump 2 is just over 1150 mm and therefore lies above the advantageous minimum value of at least 400 mm.

The maximum longitudinal extent 13, 13', 13" of the chambers 7, 7', 7" of the component 1 is at most 95 mm and at least 5 mm. Within this value range for the maximum longitudinal extent 13, 13', 13" of the chambers 7, 7', 7", the sound reduction in the near field is favorable with consideration of the wall thickness. The said value range is preferably relevant for all the chambers 7, 7', 7" of the component 1. There is a further increase in the near-field sound reduction according to the invention as a result of the narrower value range for the maximum longitudinal extent 13, 13', 13" of at most 50 mm and at least 10 mm. Here, the maximum longitudinal extent 13, 13', 13" is the maximum length within a chamber 7, 7', 7".

The circumference-to-area ratio of the chambers 7, 7', 7" of the component 1 lies in the value range from 1.0:1.5 to 1.0:5.5.

Figure 2:
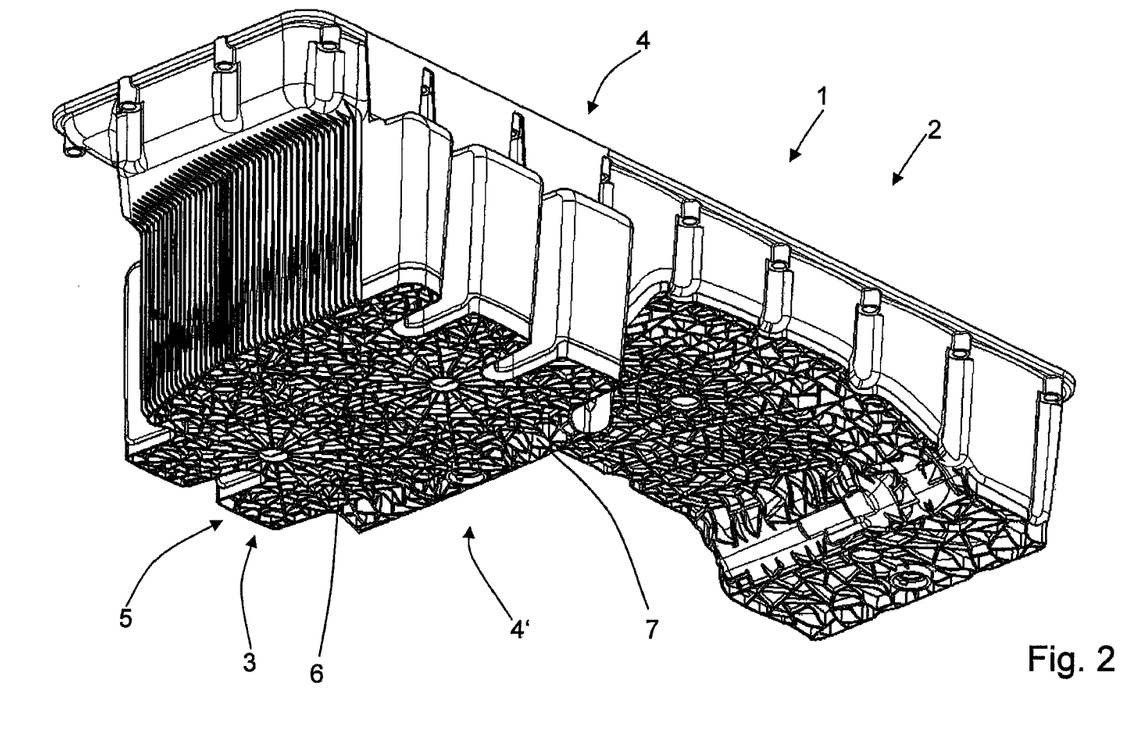
FIG. 2 is a diagrammatic perspective illustration of the oil sump from FIG. 1, obliquely from below.
Figure 4:
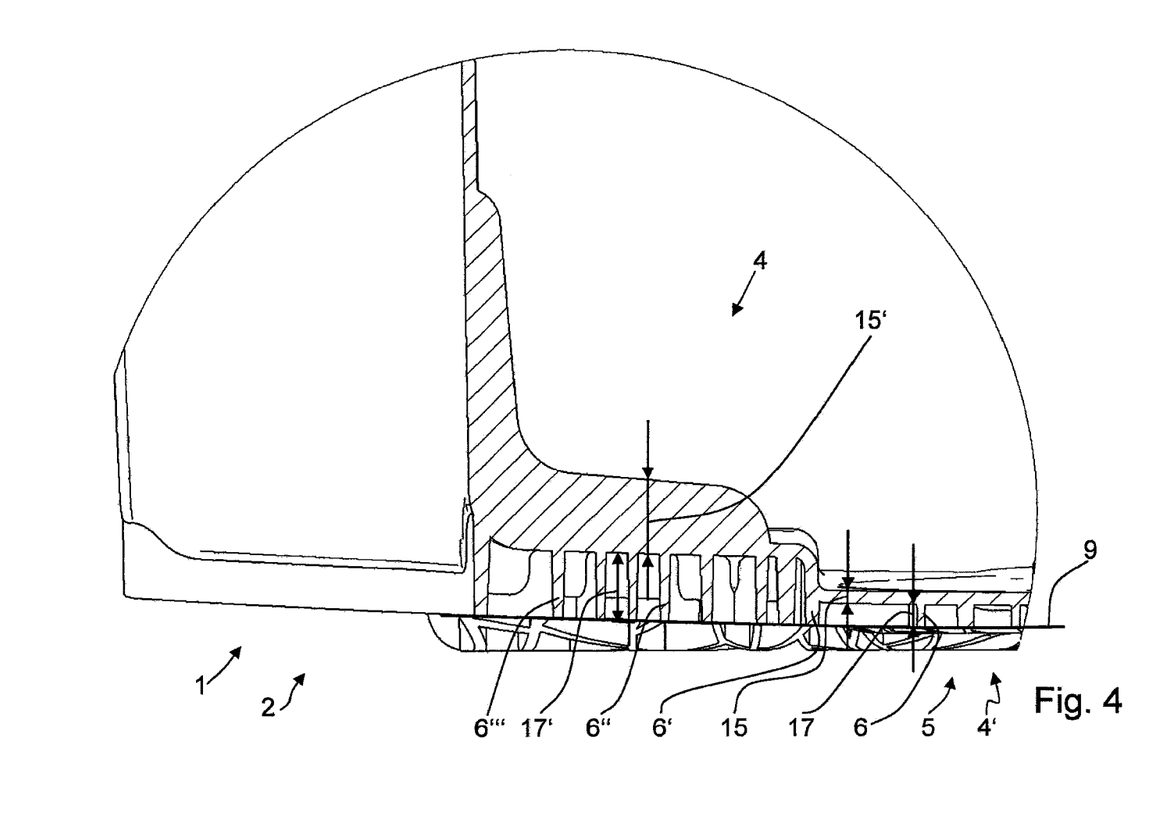
FIG. 4 is a detailed sectional illustration according to IV-IV from FIG. 3.
Figure 5:
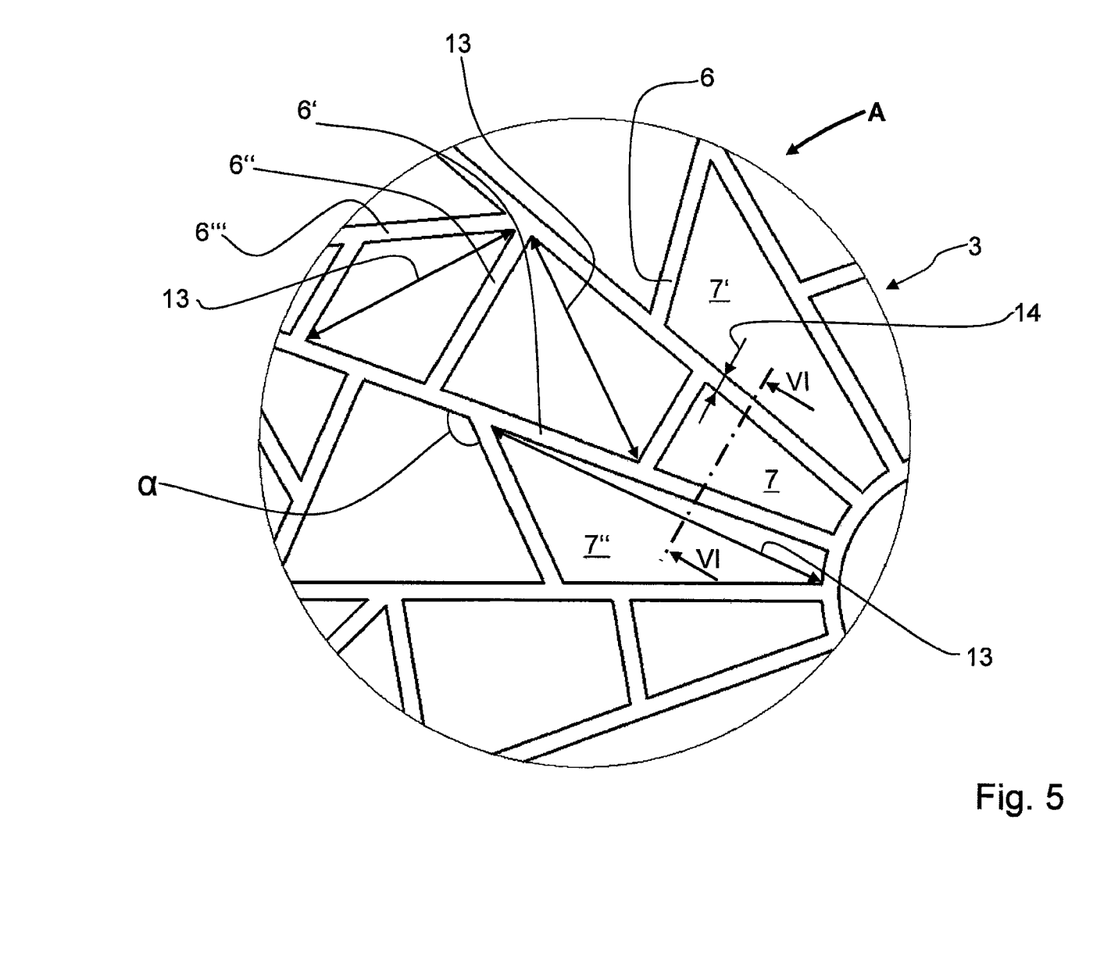
FIG. 5 is a detailed illustration according to detail A from FIG. 3.
Figure 6:
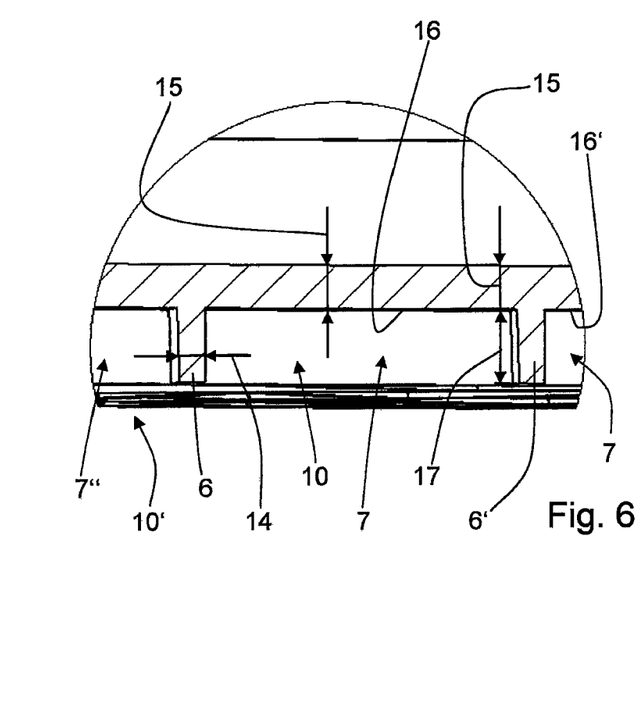
FIG. 6 shows a diagrammatic sectional illustration according to sectional line VI-VI from FIG. 5.
Figure 7:
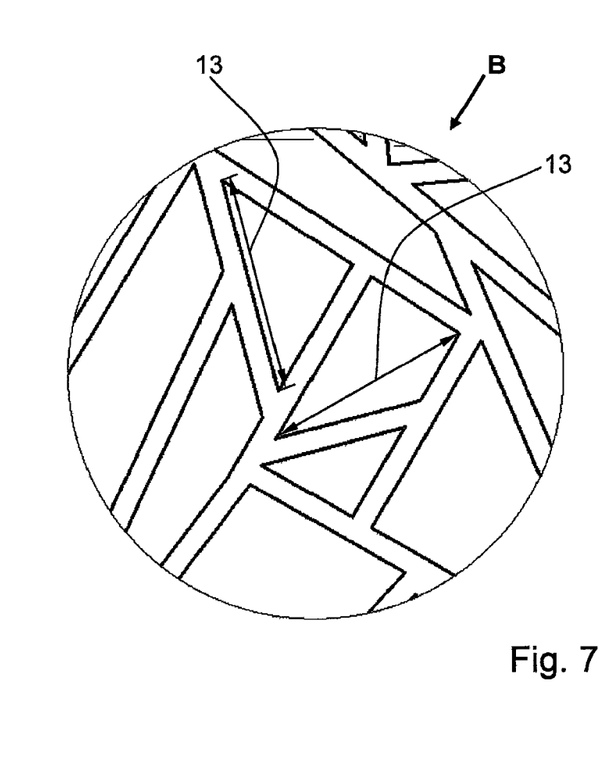
FIG. 7 shows a detailed illustration according to detail C from FIG. 4.

It can be seen from FIGS. 2, 4 and 6 that the free ends of the openings 10, 10' of the rib structure 5 of adjacent or preferably a predominant number (>85%) of chambers 7, 7', 7" lie in one plane, and/or that the bottom regions 16, 16' of adjacent or preferably a predominant number (>85%) of chambers 7, 7', 7" lie in a further second plane which is preferably parallel at least in regions to the first plane.

The ratio of the rib height 17 plus chamber-bottom thickness 15 to the chamber-bottom thickness 15 is less than 4:1, preferably less than or equal to 3.5:1.0, and particularly preferably less than or equal to 3:1. For example, the material thickness of the basic body 3 without ribs 6, 6', 6" can be used as chamber-bottom thickness 15.

FIG. 4 of the drawing shows ribs 6, 6', 6", 6'" with different rib heights 17, 17'. However, the free ends of the ribs 6, 6', 6", 6'" lie in one plane or at least in one plane region, with the result that the contour line 9 which is described via the free ends of the ribs 6, 6', 6", 6'" has a substantially constant course. It can also be seen that the ribs having the higher rib height 17' also have a greater chamber-bottom thickness 15' than the chamber-bottom thickness 15 which corresponds to the rib height 17.

FIG. 8 shows a control-housing cover 11 which is provided with a rib structure 5 according to the invention. It can be seen from the said figure that the rib structure 5 is subordinate to further structural conditions.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An acoustically damped component comprising:
a flat basic body (3) having a surface;
a rib structure (5) having ribs (6, 6', 6", 6''') provided at least in regions on at least one side of said surface of said flat basic body (3);
a plurality of chambers (7, 7', 7") formed by said ribs (6, 6', 6", 6''') of said rib structure;
said chambers (7, 7', 7") arranged irregularly on at least one region of said component and defining a plurality of part areas (8, 8');
said component constructed so as to have a resonant frequency of from 200 to 1000 Hz;
said chambers (7, 7', 7") configured irregularly such that, at least in regions, said chambers (7, 7', 7") of said component have one of different dimensioning and geometry in comparison with adjoining chambers such that, starting from said chambers emitted airborne sound is one of reduced and eradicated mutually in the near field; and
wherein a response to a transient excitation of at least two of said part areas (8, 8') of said chambers (7, 7', 7") provided on said surface of said flat basic body have a correlation of from 0.50 to 0.85.

2. The acoustically damped component according to claim 1, wherein said correlation is from 0.60 to 0.70.

3. The acoustically damped component according to claim 1, wherein said ribs (6, 6', 6", 6''') comprise a rib width (14) and said chambers (7, 7', 7") comprise a chamber-bottom thickness (15), and wherein said rib width (14) of a chamber (7) is smaller than said chamber-bottom thickness (15) of the said chamber (7); said rib width (14) to said chamber-bottom thickness (15) having a ratio from 1.0:1.2 to 1:20.

4. The acoustically damped component according to claim 3, wherein said ratio is from 1:1.8 to 1:3.

5. The acoustically damped component according to claim 1, wherein all of said ribs (6, 6', 6", 6''') of a chamber (7, 7', 7") extend rectilinearly.

6. The acoustically damped component according to claim 1, wherein all of said ribs (6, 6', 6", 6''') of a chamber (7, 7', 7") enclose an angle α of less than or equal to 180° with respect to adjacent ribs (6, 6', 6", 6''') of a chamber (7, 7', 7").

7. The acoustically damped component according to claim 1, wherein one of said geometry and dimensioning of said chambers (7, 7', 7") is selected such that the maximum emitting frequency of the adjacent chambers (7, 7', 7") one of cancel one another out and reduce one another.

8. The acoustically damped component according to claim 1, wherein said ribs (6, 6', 6", 6''') comprise a rib height (17) and said chambers comprise a chamber-bottom thickness (15); and wherein the ratio of said rib height (17) plus said chamber-bottom thickness (15) to said chamber-bottom thickness is less than 4:1.

9. The acoustically damped component according to claim 8, wherein said ratio is less than or equal to 3.5:1.0.

10. The acoustically damped component according to claim 8, wherein said ratio is less than or equal to 3:1.

11. The acoustically damped component according to claim 1, wherein said chamber has at least one of a circumference between 15 mm and 200 mm, an area of between 30 $mm^2$ and 1000 $mm^2$ and a volume of between 250 $mm^3$ and 5000 $mm^3$.

12. The acoustically damped component according to claim 11, wherein said circumference is between 35 mm and 95 mm, said area is between 60 $mm^2$ and 490 $mm^2$ and said volume is between 400 $mm^3$ and 3000 $mm^3$.

13. The acoustically damped component according to claim 1, wherein said chambers (7, 7', 7") have a circumference and an area, and wherein the circumference-to-area ratio of said chambers of said component is between 1:1 and 1:10.

14. The acoustically damped component according to claim 13, wherein said circumference-to-area ratio is between 1:1.5 and 1:5.5.

15. The acoustically damped component according to claim 1, wherein the maximum longitudinal extent (13, 13', 13") of at least half of said chambers (7, 7', 7") of said component does one of not exceed 95 mm and not undershoot 5 mm.

16. The acoustically damped component according to claim 1, wherein the maximum longitudinal extent (13, 13', 13") of all of said chambers (7, 7', 7") of said component does one of not exceed 95 mm and not undershoot 5 mm.

17. The acoustically damped component according to claim 1, wherein the maximum longitudinal extent (13, 13', 13") of at least half of said chambers (7, 7', 7") of said component does not exceed 75 mm.

18. The acoustically damped component according to claim 1, wherein said chambers (7, 7', 7") are of one of triangular and pentagonal shape.

19. The acoustically damped component according to claim 1, wherein at least half of said chambers (7, 7', 7") have one of a triangular, quadrangular and pentagonal shape.

20. The acoustically damped component according to claim 1, wherein at least one of said chambers (7, 7', 7") is surrounded by at least 5 adjacent chambers (7, 7', 7").

21. The acoustically damped component according to claim 1, wherein at least one of said chambers (7, 7', 7") is surrounded by at least 6 adjacent chambers.

22. The acoustically damped component according to claim 1, wherein at least one of said chambers (7, 7', 7") is surrounded by at least 7 adjacent chambers.

23. The acoustically damped component according to claim 1, wherein said chambers (7, 7', 7") comprise openings (10, 10'), said openings at least in regions are covered by a flexible element.

24. The acoustically damped component according to claim 23, wherein said flexible element is a flexible film.

25. The acoustically damped component according to claim 1, constructed as one of a cover element of an engine, an oil sump, an interior trim panel and an engine attachment part.

26. The acoustically damped component according to claim 25, wherein said component has a maximum longitudinal extent of 400 mm.

27. The acoustically damped component according to claim 25, wherein said component has a maximum longitudinal extent of 750 mm.

28. The acoustically damped component according to claim 25, wherein said component has a maximum longitudinal extent of 1000 mm.

29. The acoustically damped component according to claim 1, constructed so as to be mounted to cover a cavity of a further structural element, said rib structure (5) arranged on a side facing away from the cavity.

30. The acoustically damped component according to claim 1, wherein at least one first chamber (7) is designed differently with respect to one of geometry and dimensioning such that none of said chambers (7', 7") which are adjacent to the said first chamber can be one of produced and reproduced by one of scaling, inversion and rotation of said first chamber (7).

31. The acoustically damped component according to claim 1, comprising at least two part areas (8, 8') and wherein no chamber (7, 7', 7") in one of said part areas (8, 8') is identical in terms of one of geometry and dimensioning to a chamber in another one of said part areas; one of said part areas having a size of at least 5% of the entire area of said component which is provided with said chambers (7, 7', 7").

32. The acoustically damped component according to claim 31, wherein said part area has a size of at least 25% of the entire area of said component which is provided with said chambers (7, 7', 7").

33. The acoustically damped component according to claim 32, wherein said part area has a size of at least 80% of the entire area of said component which is provided with said chambers (7, 7', 7").

* * * * *